United States Patent [19]

Hannaby

[11] Patent Number: 5,064,925

[45] Date of Patent: Nov. 12, 1991

[54] COMPOSITIONS OF MATTER

[75] Inventor: Malcolm Hannaby, Leuven, Belgium

[73] Assignee: Imperial Chemical Industries, London, United Kingdom

[21] Appl. No.: 400,637

[22] Filed: Aug. 30, 1989

Related U.S. Application Data

[63] Continuation-in-part of Ser. No. 378,445, Jul. 7, 1989, Pat. No. 4,935,460, which is a continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Sep. 9, 1988 [GB] United Kingdom ............... 8821181

[51] Int. Cl.$^5$ .............................................. C08G 18/14
[52] U.S. Cl. ..................................... 528/44; 528/59; 528/73; 528/75; 524/251; 524/264
[58] Field of Search ................. 528/26, 73, 59, 75, 528/44; 524/264, 265, 251

[56] References Cited

U.S. PATENT DOCUMENTS 4,808,649  2/1989  Gay et al. .............................. 528/26
4,935,460  6/1990  Cassidy et al. ....................... 524/251

FOREIGN PATENT DOCUMENTS 1472274  10/1967  France.

*Primary Examiner*—John Kight, III
*Assistant Examiner*—Duc Truonh

[57] ABSTRACT

Isocyanate-reactive polymers having terminal enamino-functional groups are obtained by reacting ammonia or primary or secondary amines with polymers having terminal $\beta$-ketoester groups which are themselves obtained by reaction of polyols with $\beta$-ketoesters such as ethyl acetoacetate.

10 Claims, No Drawings

COMPOSITIONS OF MATTER

This is a continuation-in-part of Ser. No. 07/378,445, filed July 7, 1989, now U.S. Pat. No. 4,935,460, which is a continuation of Ser. No. 07/242,745, filed Sept. 9, 1988, now abandoned, which is a continuation-in-part of Ser. No. 07/160,647, filed Feb. 26, 1988, now U.S. Pat. No. 4,794,129, which is a continuation-in-part of Ser. No. 07/105,641, filed Oct. 6, 1987, now abandoned.

This invention relates to compositions of matter, including isocyanate-reactive compositions, to their preparation and to their use in the production of useful polymeric materials.

The manufacture of useful polymeric materials by reacting organic polyisocyanates with compounds containing isocyanate-reactive groups is well established. Thus, polyurethane materials, which may take the form of adhesives, coatings, elastomers, fibres, films, foams, thermoplastics and the like are produced on a large scale by reacting polyisocyanates with low and/or high molecular weight polyols. Similarly, polyurea products are obtained by reacting polyisocyanates with polyamines. Other isocyanate-reactive materials which are known to be useful in the production of high molecular weight polymers include the imino-functional compounds described in U.S. Pat. No. 4,794,129.

The present invention is concerned with isocyanate-reactive enamino-functional polymers and precursors thereof.

Thus, according to the invention, there is provided a composition of matter comprising a polymer having a molecular weight of at least 500 containing at least one group of the formula:

$$-O-CO-X \qquad (1)$$

wherein X represents a group of the formula:

$$-CH-CO-R^2 \qquad (2)$$
$$\phantom{-CH-}|\phantom{-CO-R^2}$$
$$\phantom{-CH-CO-}R^1$$

or

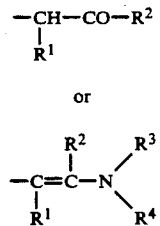

$$(3)$$

wherein $R^1$ represents hydrogen or an optionally substituted hydrocarbon radical, $R^2$ represents an optionally substituted hydrocarbon radical and each of $R^3$ and $R^4$, independently, represents hydrogen or an optionally substituted hydrocarbon radical or $R^3$ and $R^4$ together with the attached nitrogen atom form a 5- or 6-membered heterocyclic ring.

Optionally substituted hydrocarbon radicals which may be represented by $R^1$ and $R^2$ particularly include $C_{1-4}$ alkyl radicals. Especially important structures include those in which $R^1$ is hydrogen and those in which $R^2$ is methyl.

Optionally substituted hydrocarbon radicals which may be represented by $R^3$ and $R^4$ include alkyl radicals, for example $C_{1-4}$, especially $C_{1-4}$ alkyl radicals, cycloalkyl radicals, for example cyclohexyl, aralkyl radicals, for example benzyl and aryl radicals, for example phenyl. Heterocyclic rings which may be represented by $R^3$ and $R^4$ together with the attached nitrogen include pyrrolidine, piperidine and morpholine rings. Especially important structures include those in which at least one of $R^3$ and $R^4$ is hydrogen.

The preferred polymers of the invention have average molecular weights of from about 1000 to about 10000, especially from about 2000 to about 8000.

Polymers of the invention in which X is a group of Formula 2 may be prepared by reacting a hydroxyl group-containing polymer having a molecular weight of at least 400 with a β-ketoester of the formula:

$$R^2-CO-CH-COOR^5 \qquad (4)$$
$$\phantom{R^2-CO-}|$$
$$\phantom{R^2-CO-CH}R^1$$

wherein $R^1$ and $R^2$ have the meanings given above and $R^5$ represents a hydrocarbon radical, especially a $C_{1-4}$ alkyl.

A preferred ketoester of Formula 4 is ethyl acetoacetate. Polymers of the invention in which X is a group of Formula 3 may be prepared by reaction a polymer containing at least one group of Formula 1 wherein X is a group of Formula 2 with a compound of the formula:

$$R^3R^4NH \qquad (5)$$

wherein $R^3$ and $R^4$ have the meanings given above.

Preferred compounds of Formula 5 include ammonia and primary aliphatic, cycloaliphatic, arylaliphatic and aromatic amines such as n-butylamine, cyclohexylamine, benzylamine and aniline. Secondary amines may also be used.

The preferred polymers of the invention have the general formula:

$$Q(-O-CO-X)_n \qquad (6)$$

wherein Q represents the residue remaining after the removal of the hydroxyl groups from a polymeric polyol having a molecular weight of at least 400, n is an integer from 2 to 6 and X has the meaning given above.

The residue represented by Q is typically the residue of a polymeric polyol having an average nominal hydroxyl functionality of from 2 to 6 and a number average molecular weight of up to about 10000. In preferred polymers, n is an integer from 2 to 5, especially 2 or 3.

Polymers of Formula 6 in which X is a group of Formula 2 may be prepared by reacting a polymeric polyol having a molecular weight of at least 400 and an average nominal hydroxyl functionality of from 2 to 6 with a β-ketoester of Formula 4, especially ethyl acetoacetate.

As examples of polymeric polyols which may be used in the preparation of the polymers of Formula 6, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, ammonia, polyols, for example ethylene glycol, propylene glycol, diethylene glycol, cyclohexane dimethanol, resorcinol, bisphenol A, glycerol, trimethylolpropane, 1,2,6-hexanetriol, triethanolamine, pentaerythritol or sorbitol, amines, for example aniline, ethylene diamine, tolylene diamine, diaminodiphenylmethane or polymethylene polyphenylene polyamines and amino-alcohols, for example ethanolamine or diethanolamine. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 24% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(isobutylene) polyols. Suitable polysiloxane polyols include polydimethylsiloxane diols and triols.

If desired, mixtures of two or more polyols varying in functionality, molecular weight and/or polymer backbone may be used provided such mixtures conform to the average functionality and average molecular weight criteria specified herein.

The reaction between the polymeric polyol and the β-ketoester may be performed under conventional ester interchange conditions. Thus, elevated temperatures, for example 150°–200° C., and ester interchange catalysts, for example tetrabutyl titanate, may be employed. Usually, at least one mole of ketoester will be employed per hydroxyl equivalent although it is within the scope of the invention to use smaller proportions of ketoester to produce polymers containing hydroxyl groups in addition to groups of Formula 1.

Polymers of Formula 6 in which X is a group of Formula 3 may be prepared by reqacting polymers of Formula 6 in which X is a group of Formula 2 with a compound of Formula 5 under conventional enamine forming conditions.

The polymers of the invention in which X is a group of Formula 3, either alone or in conjunction with other isocyanate-reactive species, may be reacted with organic polyisocyanates, for example diphenylmethane diisocyanate and tolylene diisocyanate in their various pure, crude and modified forms, using known techniques, to form useful high molecular weight polymeric materials. Thus, those compositions having relatively low molecular weights and high isocyanate-reactive functionalities may be used in the preparation of highly crosslinked products, for example rigid foams, whilst those compositions having higher molecular weights and/or higher isocyanate-reactive functionalities may be used in the preparation of elastomeric products, for example flexible foams and elastomers, including reaction injection moulded elastomers.

The invention is illustrated but not limited by the following Examples.

EXAMPLE 1

Preparation of poly(oxypropylene)acetaoacetate of functionalty 3

A 10 1 round bottomed flask in a temperature controlled heating mantle was fitted with a mechanical stirrer, a nitrogen sparge and a vigreux column with Liebig condenser. The flask was charged with 9000 g of a 5000 molecular weight poly(oxypropylene)triol based on glycerol, 782 g of ethylacetaoacetate and 3 ml of tetrebutyltitanate catalyst. The reaction mixture was heated to 160°–170° C. with a gentle sparge of nitrogen. The progress of reaction was monitored by infrared analysis of the condensed volatiles produced during the reaction. After 440 minutes, a further 500 g of ethylacetoacetate and 2 ml of tetrabutyltitanate were added to the reaction mixture. After 690 minutes, a sample of distillate contained mainly ethanol as indicated by a peak at 3350 cm$^1$ in the infrared spectrum of the sample. After 810 minutes, the vigreux column was removed and heating was continued. Analysis of the distillate at his point showed this material to be mainly ethylacetoacetate. The excess ethylacetoacetate was then removed by the application of vacuum.

After all of the volatile components had been removed, the product was shown to have a hydroxyl value of 3.5 m g KOH/g indicating greater than 90% conversion to the poly(oxypropylene) acetoacetate.

EXAMPLE 2

Preparation of a poly(oxypropylene) - (N-cyclohexyl) aminocrotonate of functionality 3

A 10 1 round bottomed flask in a temperature controlled heating mantle was fitted with a mechanical stirrer, a nitrogen sparge and a dean-Stark apparatus. The flask was charged with 9454 g of the poly(oxypropylene) acetoacetate of example 1, 536 g of cyclohexylamine and 500 g of toluene. The reaction mixture was heated to reflux and water was collected in the dean-Stark trap.

After 670 minutes, the reaction was considered to be complete as indicated by the absence of further water in the Dean-Stark trap. Excess cyclohexylamine and toluene were removed by the application vaccum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCl$_3$ with TMS as reference showed resonances at delta-170 ppm and delta-160 ppm and delta=83 ppm corresponding to the N—$\underline{C}$=C, O—$\underline{C}$=O and N—C=$\underline{C}$ carbon atoms respectively.

EXAMPLE 3

Preparation of a poly(oxypropylene)-(n-butyl) aminocrotonate of functionality 3

A 5 l round bottomed flask in a temperature controlled heating mantle was fitted with mechanical stirrer, a nitrogen sparge and a Dean-Stark apparatus. The flask was charged with 3500g of the poly(oxypropylene)acetoacetate of example 1, 167 g of n-butylamine and 750 g of toluene. The reaction mixture was heated to reflux and water was collected in the Dean-Stark trap.

After 240 minutes the reaction was considered to be complete as indicated by the absence of further water in the Dean-Stark trap. Excess n-butylamine and toluene were removed by the application of vacuum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCL$_3$ with TMS as reference showed resonances at delta-170ppm and delta-160 ppm and delta=83 ppm corresponding to the N—$\underline{C}$=C, O—$\underline{C}$=O and N—C=$\underline{C}$ carbon atoms respectively.

EXAMPLE 4

Preparation of a poly(oxypropylene)-aminocrotonate of functionality 3

A 10 l round bottomed flask in a temperature controlled heating mantle was fitted with a mechanical stirrer, a nitrogen sparge and a Dean-Stark apparatus. The flask was charged with 3000 g of the poly(oxypropylene)acetoacetate of example 1, 128 g of 10% aqueous ammonia and 750 g of toluene. The reaction mixture was heated to 40° C. and the reaction versel was tightly sealed.

After 20 hours the reaction was considered to be complete as indicated by the content of titratable amine in the reaction mixture. Excess ammonia, water and toluene were removed by the application of vacuum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCL$_3$ with TMS as reference showed resonances at delta-170 ppm and delta-160 ppm and delta=83 ppm corresponding to the N—$\underline{C}$=C, O—$\underline{C}$=O and N—C=$\underline{C}$ carbon atoms respectively.

EXAMPLE 5

Preparation of poly(oxypropylene)acetoacetate of functionality 2

A 5 l round bottomed flask in a temperature controlled heating mantle was fitted with a mechanical stirrer, a nitrogen sparge and a vigreux column with Liebig condensor. The flask was charged with 3000 g of a 2000 molecular weight poly(oxypropylene) diol based on monoethyleneglycol, 651 g of ethylacetoacetate and 3 drops of tetrabutyltitanate catalyst. The reaction mixture was heated to 160°-170° C. with a gentle sparge of nitrogen. The progress of reaction was monitored by infrared analysis of the condensed volatiles produced during the reaction.

After 300 minutes a sample of distillate contained mainly ethanol as indicated by e peak at 3350 cm$^1$ in the infrared spectrum of the sample.

The vigreux column was removed and heating was continued. Analysis of the distillate at this point showed this material to be mainly ethylacetoacetate. The excess ethylacetoacetate was then removed by the application of vacuum.

After all of the volatile components had been removed the product was shown by 13$_C$ NMR spectroscopy to be desired product poly(oxypropylene) acetoacetate.

EXAMPLE 6

Preparation of a poly(oxypropylene)-(N-cyclohexyl) aminocrotonate of functionality 2

A 5 l round bottomed flask in a temperature controlled heating mantle was fitted with a mechanical stirrer, a nitrogen sparge and a Dean-Stark apparatus. The flask was charged with 1500 g of the poly(oxypropylene)acetoacetate of example 5, 151 g of cyclohexylamine and 500 g of toluene. The reaction mixture was heated to reflux and water was collected in the Dean-Stark trap.

After 365 minutes the reaction was considered to be complete as indicated by the absence of further water in the Dean-Stark trap. Excess cyclohexylamine and toluene were removed by the application of vacuum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCL$_3$ with TMS as reference showed resonances at delta-170 ppm and delta-160 ppm and delta=83 ppm corresponding to the N—$\underline{C}$=C, O—$\underline{C}$—O and N—C=$\underline{C}$ carbon atoms respectively.

I claim:

1. A composition of matter comprising a polymer having a molecular weight of at least 500 containing at least one group of the formula:

—O—CO—X wherein X represents a group of the formula:

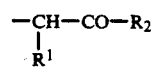

or

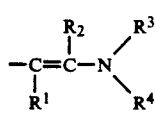

wherein R$^1$ represents hydrogen or an optionally substituted hydrocarbon radical, R$^2$ represents an optionally substituted hydrocarbon radical and each R$^3$ and R$^4$, independently, represents hydrogen or an optionally substituted hydrocarbon radical or $R^3$ and $R^4$ together with the attached nitrogen atom form a 5- or 6-membered heterocyclic ring, whereby said polymer is the residue remaining after removal of hydroxyl groups from a polymeric polyol having a nominal hydroxyl functionality of from 2-6 selected from the group consisting of polyester, polyester amide, polythioether, polyacetal, polyolefin and polyether/polyols.

2. A composition according to claim 1 wherein $R^2$ is methyl, $R^1$ is hydrogen and at least one of $R^3$ and $R^4$ is hydrogen.

3. A composition according to claim 1 wherein the polymer has a molecular weight of from about 1000 to about 10000.

4. A composition according to claim 1 wherein the polymer has the general formula:

$$Q(-O-CO-X)_n$$

wherein Q represents the residue remaining after removal of the hydroxyl groups from a polymeric polyol having a molecular weight of at least 400, n is an integer from 2 to 6 and X has the meaning given in claim 1.

5. A composition according to claim 4 wherein n is 2 or 3.

6. A composition according to claim 4 wherein the polymeric polyol is a polyether polyol.

7. A composition according to claim 4 wherein X is a group of the formula:

$$-CH-CO-R^2$$
$$\phantom{-CH-}|$$
$$\phantom{-CH-CO-}R^1$$

wherein $R^1$ and $R^2$ are as defined in claim 1 and $R^5$ represents a hydrocarbon radical.

8. A composition according to claim 7 wherein the polymer has the formula:

$$Q(-O-CO-CH_2-CO-CH_3)_n$$

9. A composition according to claims 4 wherein X is a group of the formula:

$$-C=C-N\begin{matrix}R^2 & R^3\\ | & \diagup \\ | & \diagdown \\ R^1 & R^4\end{matrix}$$

said polymer being a reaction product of a polymer as defined in any of claims 10 to 12 and a compound of the formula:

$$R^3R^4NH$$

wherein $R^1$, $R^2$, $R^3$ and $R^4$ are as defined in claim 1.

10. Process for preparing a high molecular weight polymer by the reaction of an organic polyisocyanate and a composition as defined in claim 8.

* * * * *